US007053769B2

(12) United States Patent
Vassallo

(10) Patent No.: US 7,053,769 B2

(45) Date of Patent: May 30, 2006

(54) VEHICLE SECURITY METHODS AND APPARATUS

(76) Inventor: David Vassallo, PO Box 119, Oatlands, NSW 2117 (AU)

( * ) Notice: Subject to any disclaimer, the term of this patent is extended or adjusted under 35 U.S.C. 154(b) by 157 days.

(21) Appl. No.: 10/498,129

(22) PCT Filed: Dec. 20, 2002

(86) PCT No.: PCT/AU02/01724

§ 371 (c)(1), (2), (4) Date: Jun. 9, 2004

(87) PCT Pub. No.: WO03/056511

PCT Pub. Date: Jul. 10, 2003

(65) Prior Publication Data

US 2005/0035882 A1 Feb. 17, 2005

(30) Foreign Application Priority Data

Dec. 24, 2001 (AU) .................................... PR9749

Jun. 20, 2002 (AU) .................................... PS3113

(51) Int. Cl.

*G08B 1/08* (2006.01)

*H04Q 7/00* (2006.01)

(52) U.S. Cl. .................... 340/539.1; 340/5.8; 340/434; 340/426.15; 340/426.22

(58) Field of Classification Search ................ 340/539, 340/539.1, 5.8, 5.81, 5.82, 5.86, 426.15, 340/426.22, 434

See application file for complete search history.

(56) References Cited

U.S. PATENT DOCUMENTS

| | | | | |
|---|---|---|---|---|
| 5,864,623 | A * | 1/1999 | Messina et al. | 340/5.86 |
| 6,396,412 | B1 * | 5/2002 | Banas | 340/5.2 |
| 6,758,394 | B1 * | 7/2004 | Maskatiya et al. | 235/379 |

* cited by examiner

*Primary Examiner*—Thomas J. Mullen, Jr.
*Assistant Examiner*—Samuel J. Walk
(74) *Attorney, Agent, or Firm*—Molins & Co.

(57) ABSTRACT

A vehicle safety system is disclosed. There are three major parts of the system—the proximity reader (200) mounted in the taxi (201), the host system (202) at a central location (203) and the data replication facility. The vehicular system (10) is essentially a computer having inputs and outputs. The inputs to the system (10) include, for example, passenger identification information (11) which is supplied by a sensor (12) which communicates with a wireless smart card (13), which is carried by a passenger (14). In its most rudimentary form, the smart card (13) transmits a unique identification number. In more sophisticated embodiments, the smart card (13) may also transmit biometric information such as fingerprint information or facial image information. The passenger (14) may also be requested to input a PIN number to a keypad (15) mounted on the exterior of the vehicle (16).

20 Claims, 11 Drawing Sheets

VEHICLE SECURITY METHODS AND APPARATUS

TECHNICAL FIELD

The invention pertains to vehicle security systems for taxi drivers and their passengers and more particularly to a vehicle security system utilizing wireless remote identification with access to a wireless or other networked database.

BACKGROUND OF THE INVENTION

Taxi drivers are too frequently injured or killed while on their shift. Many such assaults have gone unreported and few arrests usually result, owing to poor identification of the perpetrators. Taxi drivers are not always the victims of these crimes. A number of taxi drivers have been convicted for crimes against passengers.

OBJECTS AND SUMMARY OF THE INVENTION

Accordingly, it is desirable that a security system prescreens a passenger prior to admission into a taxi and optionally records the identity of both the taxi driver and the passenger as well as other details as required. Such a system would provide a safer working environment for drivers at all times.

Accordingly, there is provided a pre-entry screening device for a vehicle such as a taxicab. The device comprises a sensor which is adapted to detect radio frequency signals or magnetic fields associated with a passenger smart card. The sensor is adapted to provide passenger identification information to a microprocessor located within the taxi. The microprocessor is part of a vehicle information system which is adapted to compare the passenger identification information with information provided from a remote database. The vehicular information system may also require the entry of a passenger pin number. The vehicular information system is adapted to perform any one or more of a number of tasks which are intended to alert the driver to the likelihood of an irregularity associated with the passenger and maintain a record of passenger and taxi activity.

In some embodiments of the invention, the passenger's smart card contains digital image information which corresponds to a biometric of the passenger such as an image of the passenger's face or fingerprint.

In other embodiments of the invention, one component of the vehicular information system is adapted to display an image corresponding to the image data on the passenger's smart card.

In other embodiments of the invention, the vehicular information system is adapted to establish a wireless connection with a remote database and exchange information with that database.

In yet further embodiments, the vehicular information system further comprises an externally mounted keypad which is provided so that the passenger may enter a PIN number prior to entry.

BRIEF DESCRIPTION OF THE DRAWING FIGURES

In order that the invention may be more readily understood and put into practical effect, reference will now be made to the accompanying drawings in which.

BEST MODE AND OTHER EMBODIMENTS OF THE INVENTION

Figure 1:
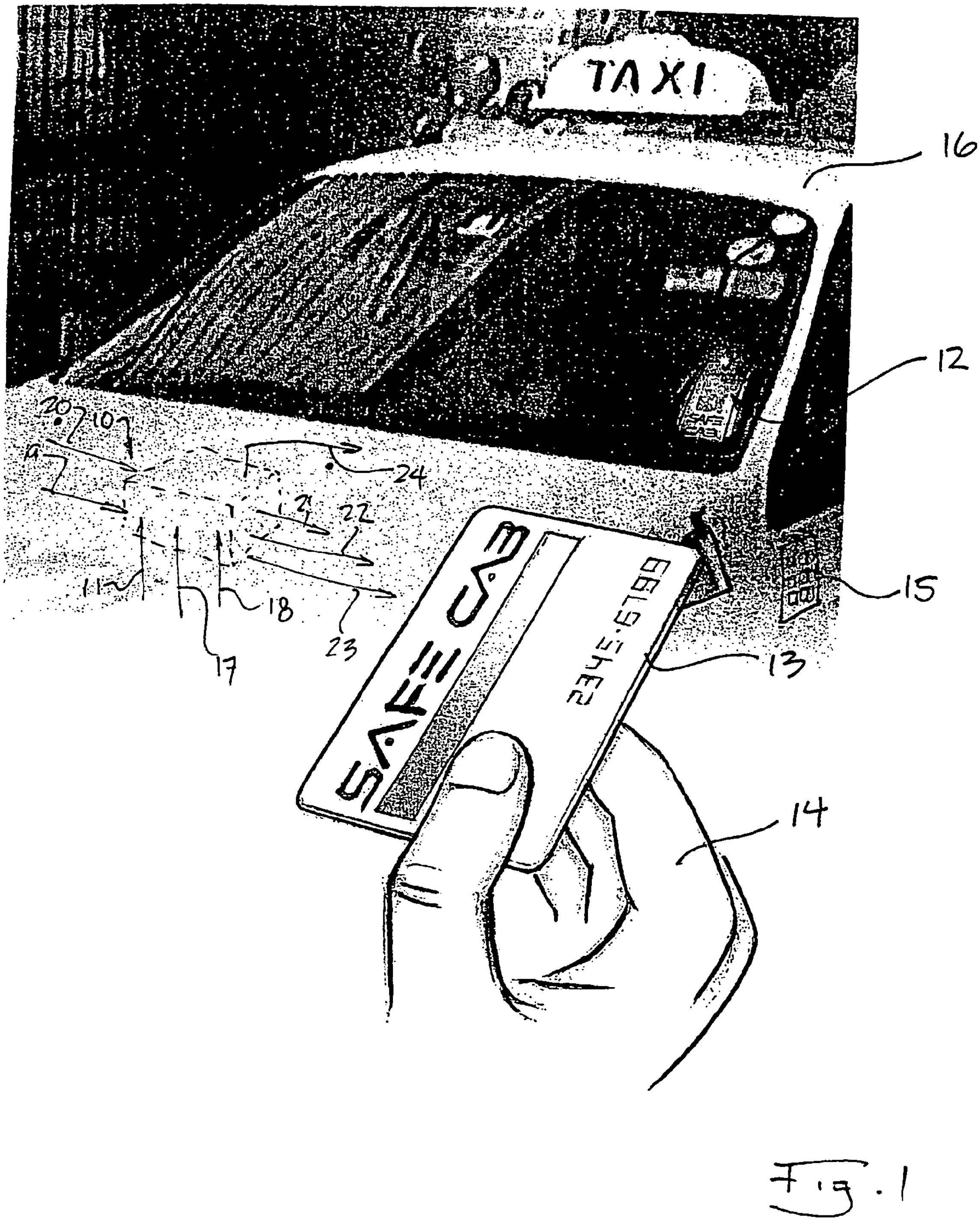
FIG. 1 is a schematic diagram illustrating a first embodiment of the present invention.

As shown in FIG. 1, a vehicle security system with network features comprises various components including a vehicular mounted information system 10 which includes all of the hardware and software necessary to perform the security features which are the subject of the present invention. The vehicular information system 10 is essentially a computer having inputs and outputs. The inputs to the system 10 include, for example, passenger identification information 11 which is supplied by a sensor 12. The sensor 12 is a reader or transponder which communicates with a wireless smart card 13, which is carried by a passenger 14. The smart card 13 may be, for example, a radio frequency identification (RFID) smart card, Hall effect etc. Device which is capable of transmitting data to the sensor 12. In its most rudimentary form, the smart card 13 transmits a unique identification number. In more sophisticated embodiments, the smart card 13 may also transmit biometric information such as fingerprint information or facial image information. In other embodiments of the invention, the passenger 14 may also be requested to input a PIN number to a keypad 15 mounted on the exterior of the vehicle 16. PIN data from the external keypad 15 may also comprise an input 17 to the information system 10. As will be explained below, a further input to the information system 10 may be in the form of data collected or extracted from a remote database 18. The information system 10 may also accept driver inputs 19 for example, in the form of data from a drivers keypad or microphone. Input data 20 may also be in the form of vehicle data such as that which may be generated by a GPS, camera, odometer or other vehicle mounted sensor.

Outputs of the information system 10 may include signals 21 for generating audible or visual alarms for the taxi's driver, signals 22 for automatically opening or closing the locks associated with the taxi's doors, display data 23 for generating a graphic display on a screen within the taxi's interior and one or more data outputs 24 which are provided to communications devices which establish links and exchange data with a remote database.

Figure 2:
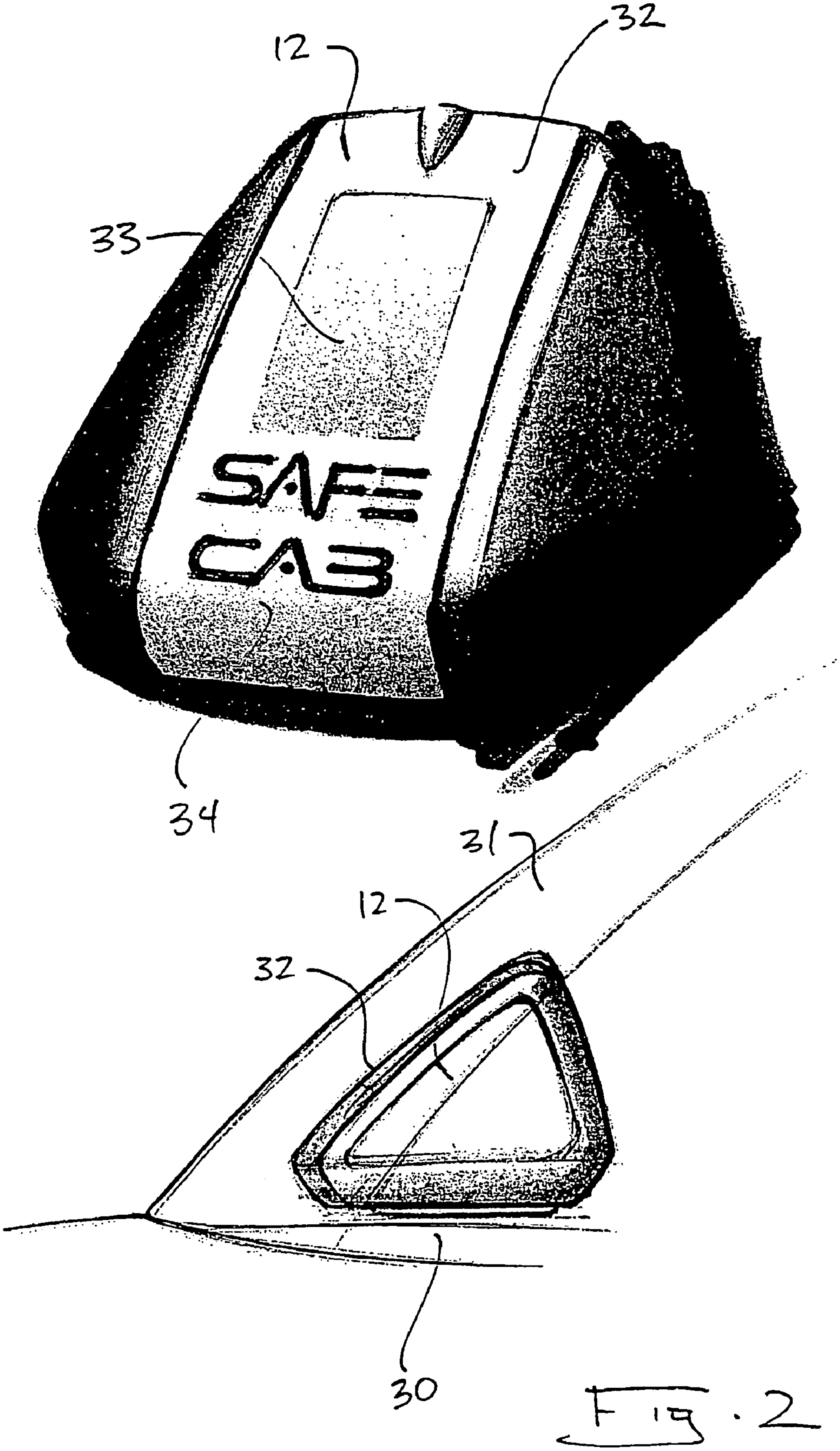
FIG. 2 illustrates in perspective and side elevations the scanner and display unit according to the teachings of the present invention.

As shown in FIG. 2, a combination sensor and display unit 12 comprises a wedge shaped consol which fits above the dashboard 30 of a vehicle and below the windscreen 31. This configuration permits the front surface 32 of the sensor and display unit 12 to lie close to and preferably parallel to the windscreen 31. The front surface 32 may incorporate an antenna or other sensor or reader portion 33 and may also carry branding or other text information 34.

Figure 3:
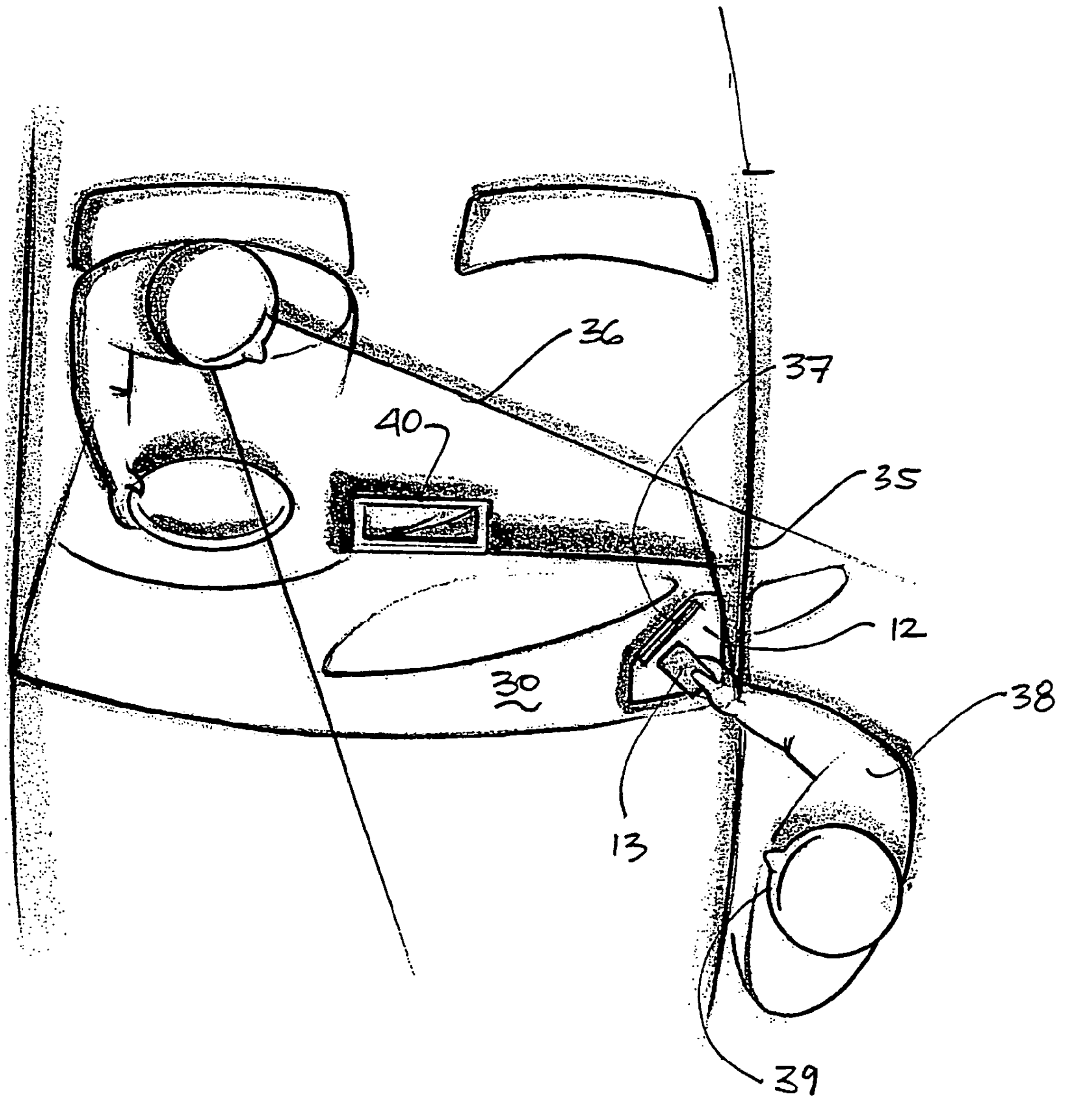
FIG. 3 is a schematic diagram illustrating a taxi driver's view of a passenger utilising the present invention.

As shown in FIG. 3, one acceptable location for the sensor and display unit 12 is above the dashboard 30 and toward the passenger side door 35. This allows the driver's field of vision 36 to include both the display screen 37 built into the unit 12 and the passenger 38 (in particularly the face 39). This configuration for the sensor and display unit 12 also allows the passenger 38 to present their smart card 13 in a convenient location prior to entering the passenger side 35 of the vehicle 16. It will be observed that the driver's field of vision 36 also incorporates another and optional display screens 40 which the driver requires.

Figure 4:
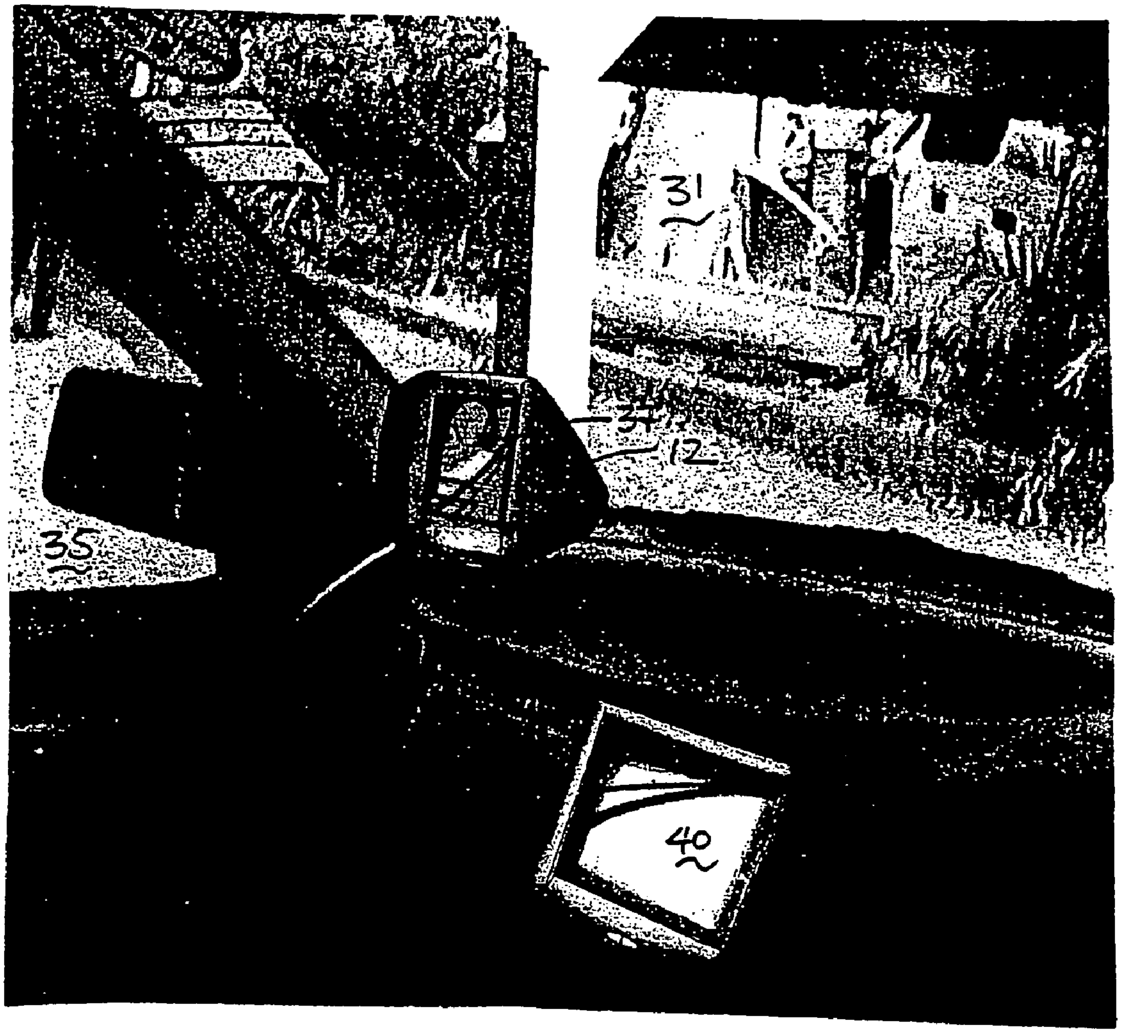
FIG. 4 is a perspective view simulating a driver's viewpoint.

As shown in FIG. 4, the driver's perspective 36 incorporates the display area 37 of the sensor and display unit 12, the optional display 40 and a clear view of the passenger through the windscreen 31.

Figure 5:
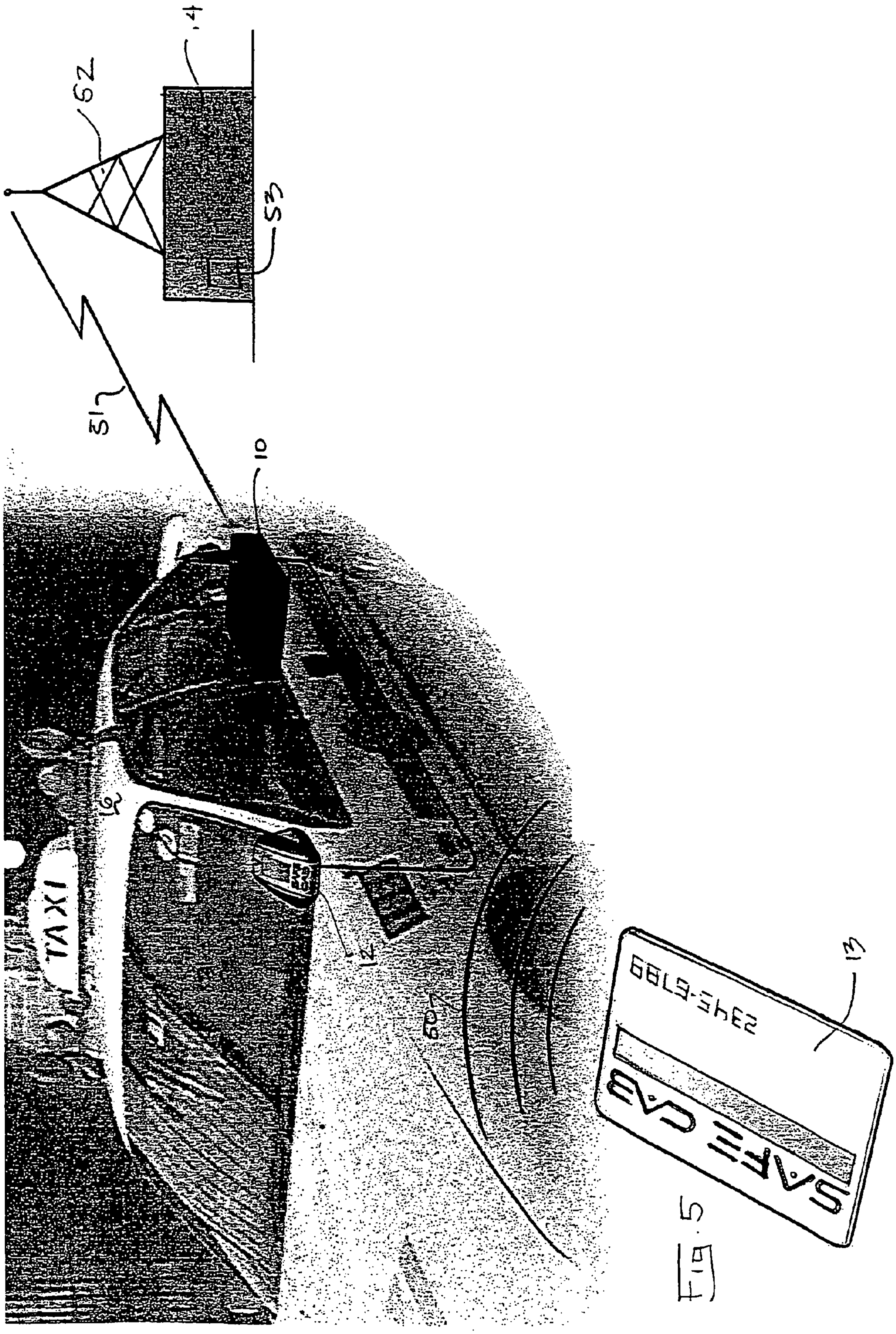
FIG. 5 is a schematic diagram illustrating a second embodiment of the present invention.

As shown in FIG. 5, the passenger's smart card 13 communicates 50 with the sensor and display unit 12. In this embodiment, the smart card 13 uploads the passenger's digital image data so that the display area 37 is caused to generate an image corresponding to the one held by the smart card 13. The driver makes a visual comparison between the image on the display screen 37 and the passenger's face 39. Location and trip details may also be recorded, for example with a GPS accessory as will be explained.

In this particular embodiment, the vehicular information system 10 also receives radio signals 51 from a remote transmitter 52. The information system 10 compares known passenger information from a remote database 53 to the information derived from the smart card 13. In this way, the information system 10 may periodically upload or download data to or from the head office 54 by wireless modem and also download updates of banned, lost and stolen cards which information is held by the database 53 and transmitted 51 to the information system 10. A system such as this requires passengers to supply personal data when requesting a passenger smart card 13. This personal data is kept on the database and some information may be stored on the card 13 itself.

Figure 6:
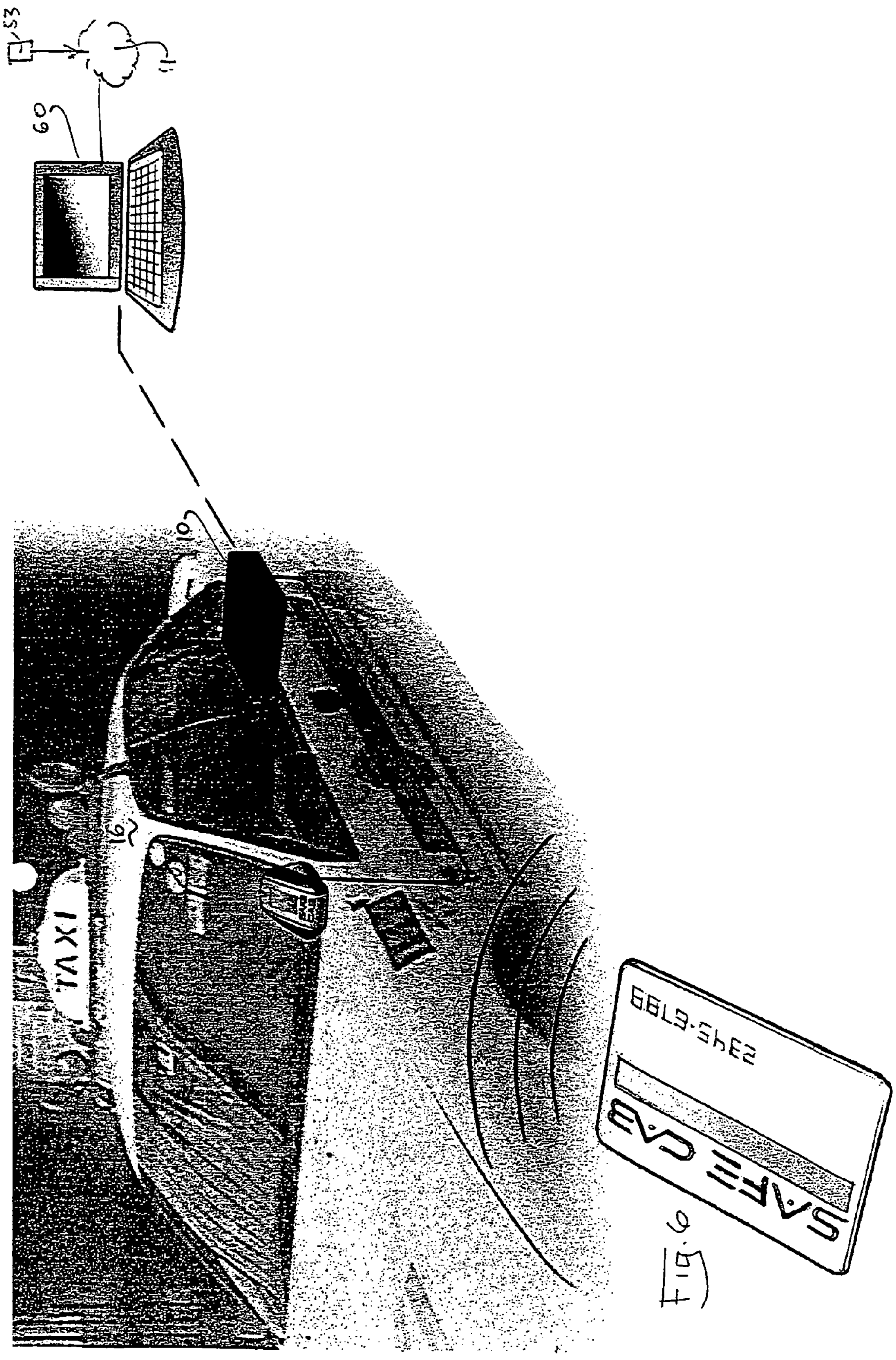
FIG. 6 is a schematic diagram illustrating a third embodiment of the present invention.

FIG. 6 illustrates another embodiment of the invention. In this embodiment, the vehicular information system 10 establishes a connection with a PC 60. This connection may be established by wireless or telephonic modem or by other means such as physical cabling etc. In this embodiment, passenger data is stored in the information system 10 when it is provided from the PC 60. In preferred embodiments, the PC 60 is connected to a network 61 through which it obtains the information which is required by the driver of the vehicle 16.

Figure 7:
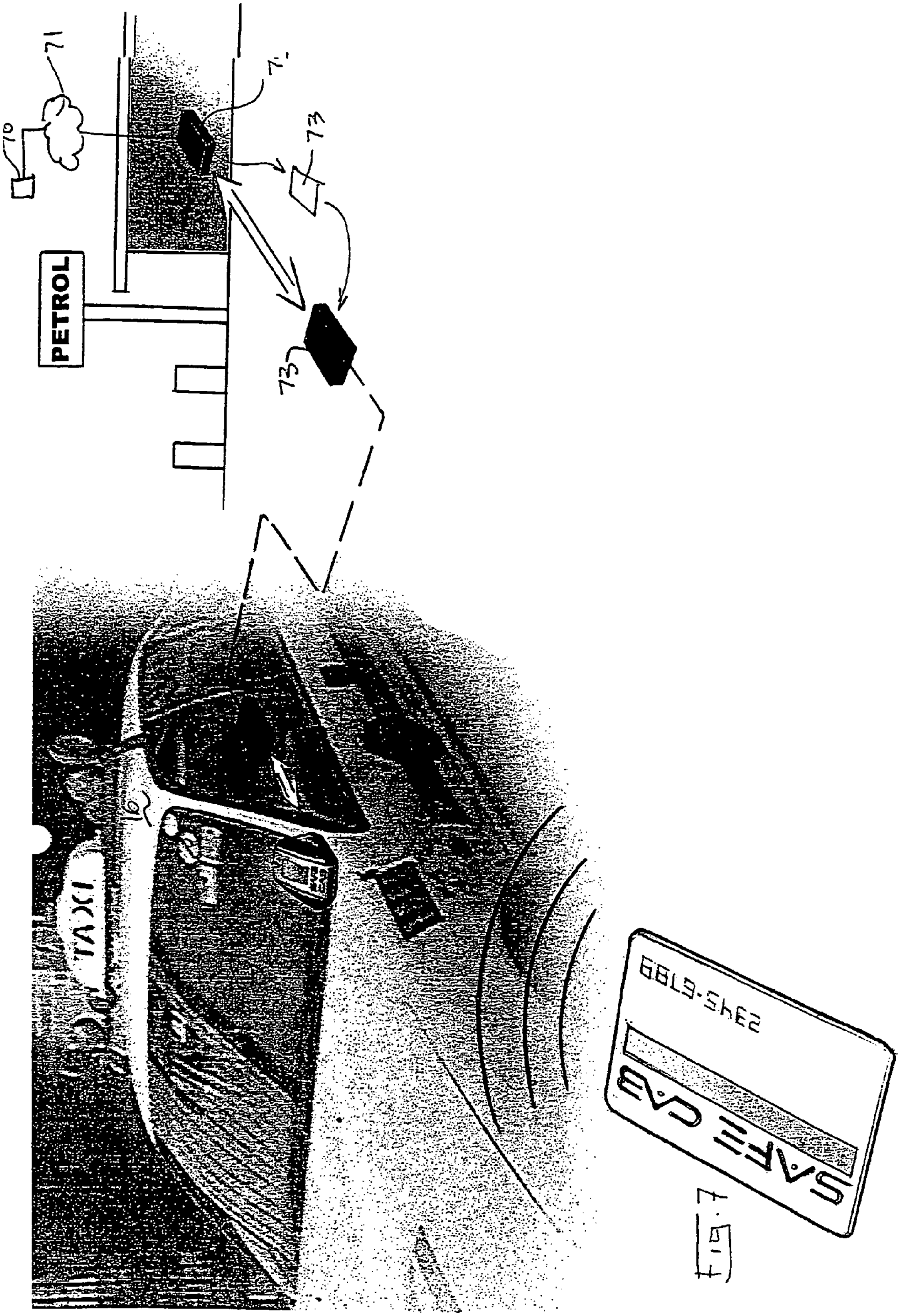
FIG. 7 is a schematic diagram illustrating a fourth embodiment of the present invention.

As shown in FIG. 7, a further embodiment of the invention allows the driver of the vehicle 16 to obtain data from a remote database 70 which is connected to a network 71. The network 71 supplies data to a terminal 72 which in turn writes the data to a physical device such as a memory card 73. The driver of the vehicle 16 is able to obtain the memory card 73 at a convenient location such as a petrol station or taxi depot. Insertion of the memory card 73 into the vehicles information system 10 allows the system 10 to perform the necessary comparisons referred to above.

In summary, the invention provides a way of comparing information from a centralised database of passenger information (eg 53, 70) to data provided by a passenger's smart card 13. The system allows the display of an image stored on the smart card 13 on a display unit 37 which is easily visible to the vehicle's driver. Accordingly, the system allows the driver to deny entry to unwanted passengers and also provides a means of optionally storing, transmitting or displaying other information on a secondary display unit 40 (see FIG. 3). This other information 40 may include promotional or advertising information generated specifically to suit the characteristics (such as age, location, time) of the passenger 14 whose smart card 13 is presented to the sensor 12.

Figure 8:
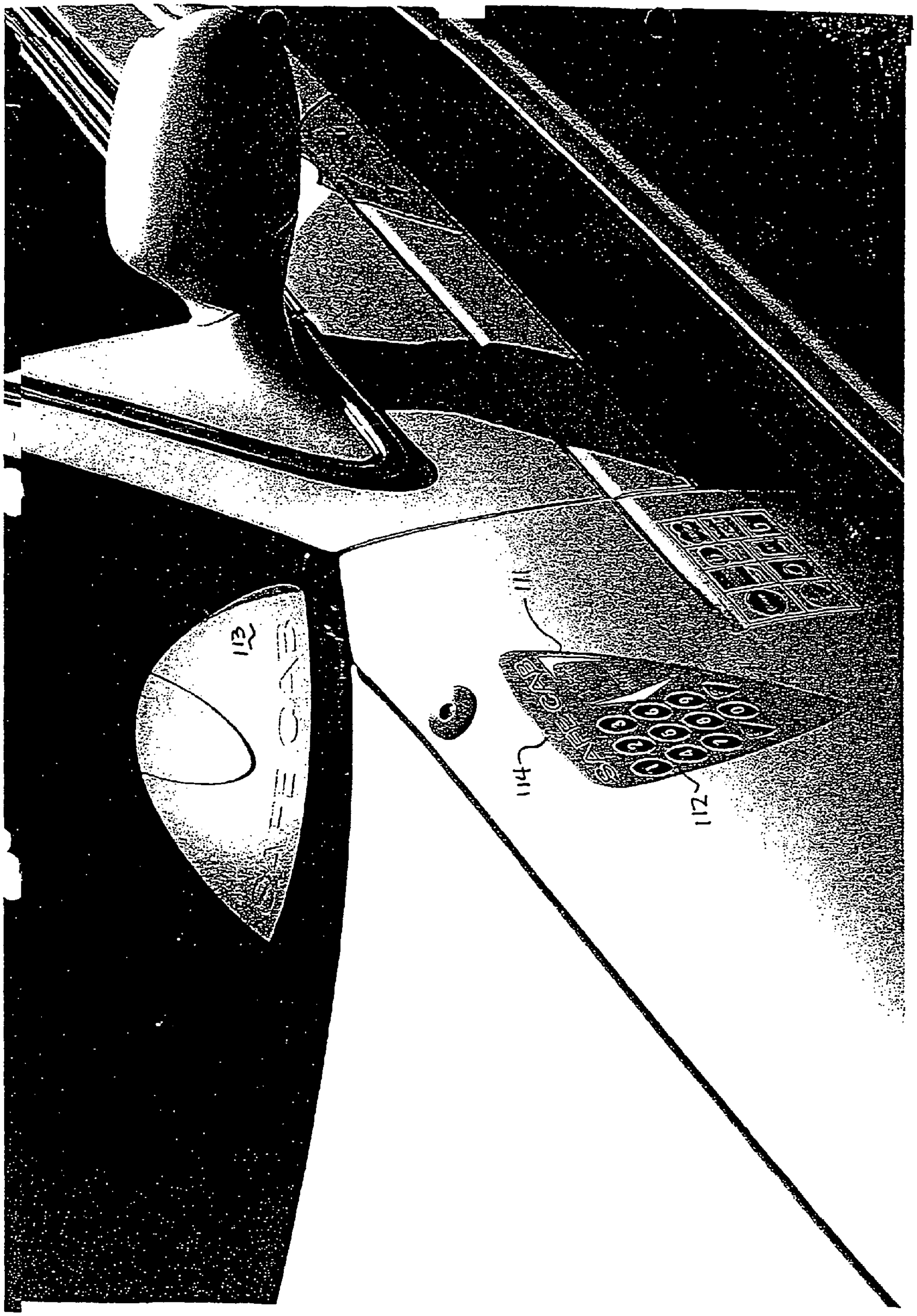
FIG. 8 is an exterior perspective view of a taxi illustrating both a combined detector and keypad mounted on an exterior surface as well as an interior mounted annunciation.

As shown in FIG. 8, a pre-entry screening system for a vehicle such as a taxi comprises a sensor 111, a keypad 112 and an enunciator 113. The detector 111 is preferably a card scanner such as one which would be adapted to receive radio frequency emissions or magnetic fields associated with a passenger's personal identity card. It will be appreciated that the passenger may use a number of other devices besides a card. Key rings, tokens or wireless devices such as telephones may be used in place of a RFID, magnetic strip or Hall effect card. The detector 111 is controlled by a microprocessor which interprets the electromagnetic or radio emissions or fields associated with the passenger's card. The detector 111 derives therefrom a number which is compared to a stored list of valid numbers or operated upon by an algorithm to determine whether or not the passenger's card (or other device) is a valid one. If the passenger's card is valid, then the microprocessor or processing system enables itself to detect and interpret the entry of a PIN number from, for example, the keypad 112. The PIN number entered on the keypad 112 is compared to a list of valid PINS or is input into an algorithm which is capable of identifying and distinguishing valid from invalid PIN numbers. Where the microprocessing system determines that the card presented to the detector 111 is a valid one and the PIN number entered on the keypad 112 (or otherwise) is a pin which is associated with the passenger's card, then the appropriate signal is sent to the enunciator 113.

In preferred embodiments, when the pre-entry screening system is operational but not actually in use, the enunciator 113 will be illuminated from within with a light emitting device such as a light bulb or LED of a first colour such as yellow. If either the card or PIN or both are invalid, then the signal sent to the enunciator 113 will cause the illumination of a light emitting device of a second colour, such as red. If both the passenger's identification card and PIN are valid and associated with one another, then a signal is sent to the enunciator 113 which causes the illumination of a third emitting device of a third colour, such as green. In this way, the driver is given a near instantaneous indication of whether or not the potential passenger has a valid card and the appropriate PIN number. In line with the above example, the driver will use the red or green indication to assist him with a decision as to whether or not to admit the passenger. The driver may always resort to his own visual or other determination in consultation with the information provided by the enunciator 113. It will also be appreciated that a driver may be supplied with audible signals in addition to or as a substitute for the visual signals provided by the enunciator 113.

As shown in FIG. 8, the enunciator 113 is preferably located behind the windscreen of the vehicle and above the dashboard so that it is easily seen by both the driver and the passenger from most orientations.

Figure 9:
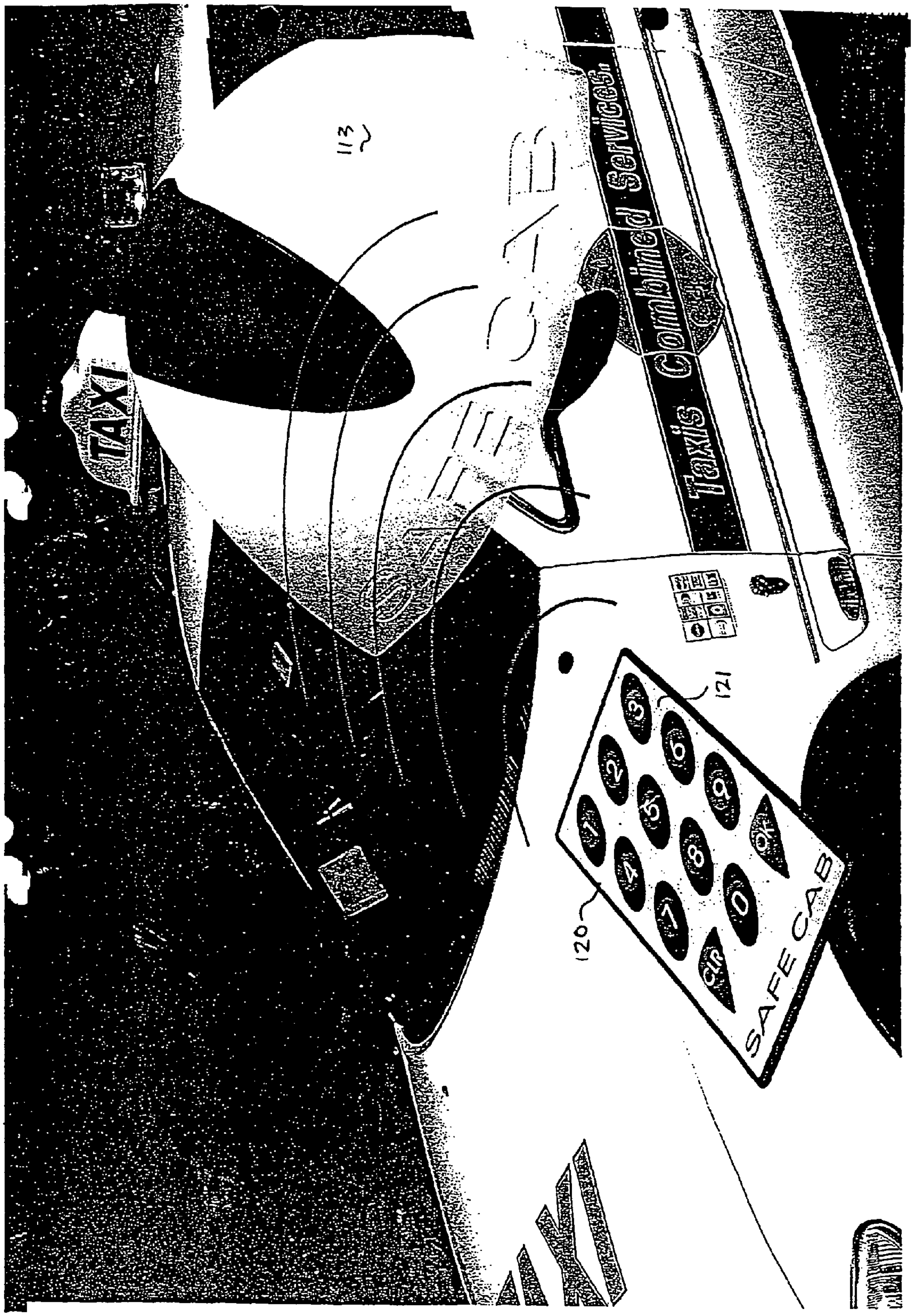
FIG. 9 is an exterior perspective view of a taxi illustrating a passenger's pre-entry screening card.

As shown in FIG. 9, a passenger identity card (or other device) can be adapted to emit radio frequency signals which can be received by the detector 11 or by electronics mounted within the enunciator 113. The passenger identification card 120 may optionally be equipped with a numeric keypad 121 which may be used in place of the keypad 12 mounted on the exterior of the vehicle. A wireless device such as a palm computer or telephone may also be used.

As shown in FIG. 8, the detector 111 and keypad 112 may be combined into a single thin membrane style device which may be adhered to an exterior surface. The electrical lead wires associated with the detector 111 and keypad 112 can pass through an opening in the vehicle body located beneath the panel 114. The lead wires are long enough to communicate with the processor and control system which may be located conveniently within the vehicle.

Figure 10:
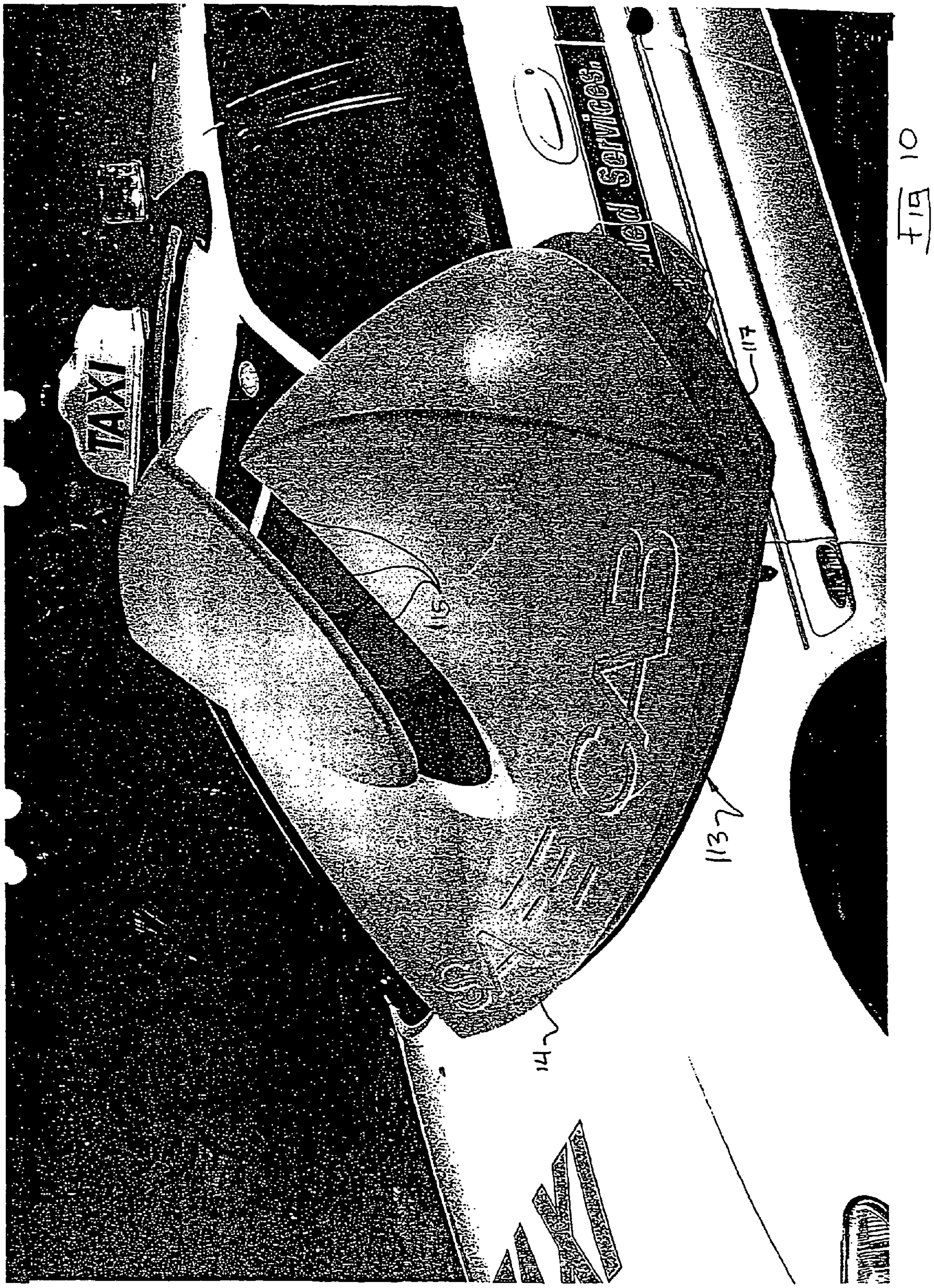
FIG. 10 is a perspective view of an enunciator with internal illumination.

As shown in FIG. 10, the enunciator 113 preferably comprises a hollow polymeric body 114 within which is located the various coloured lights or LEDs 15. Because the hollow body 114 is preferably formed from a transparent or translucent polymer, the illumination of a single coloured bulb or LED 115 causes the entire exterior of the device to glow in the appropriate colour. This provides an effective indication of the success or failure of the pre-entry screening from nearly any angle of view. The device is generally wedge-shaped, having an inclined front surface 116 and generally flat bottom 117.

In some embodiments of the invention it may be preferred to have the microprocessor control system of the pre-entry screening system actually control the vehicle central locking system. In this type of configuration, the driver is provided with an override switch. The override switch provides the driver with the option of locking the vehicle even when a positive indication is given or unlocking the vehicle even when a negative indication is given. In other embodiments, the central processor of this system can be linked by radio or by telephone to a police assistance system or other network.

It will be appreciated that the database required to support the list of valid passenger ID card numbers and valid PIN numbers can be stored locally within the vehicle and updated from a remote source or the entire database can be located remotely from the taxi whereby the taxi has a wireless network connection to that database. Similarly, data captured during use about the identity of passengers cards and the PIN numbers may be stored locally or transmitted to a remote database. Records kept by a central authority enable the linking of a PIN number to a particular passenger so that the identity of the passenger is captured by the system. Similarly, a driver may be required to enter a driver PIN number in order to activate the system thereby linking the identity of the driver to the operation of the system of the present invention.

Figure 11:
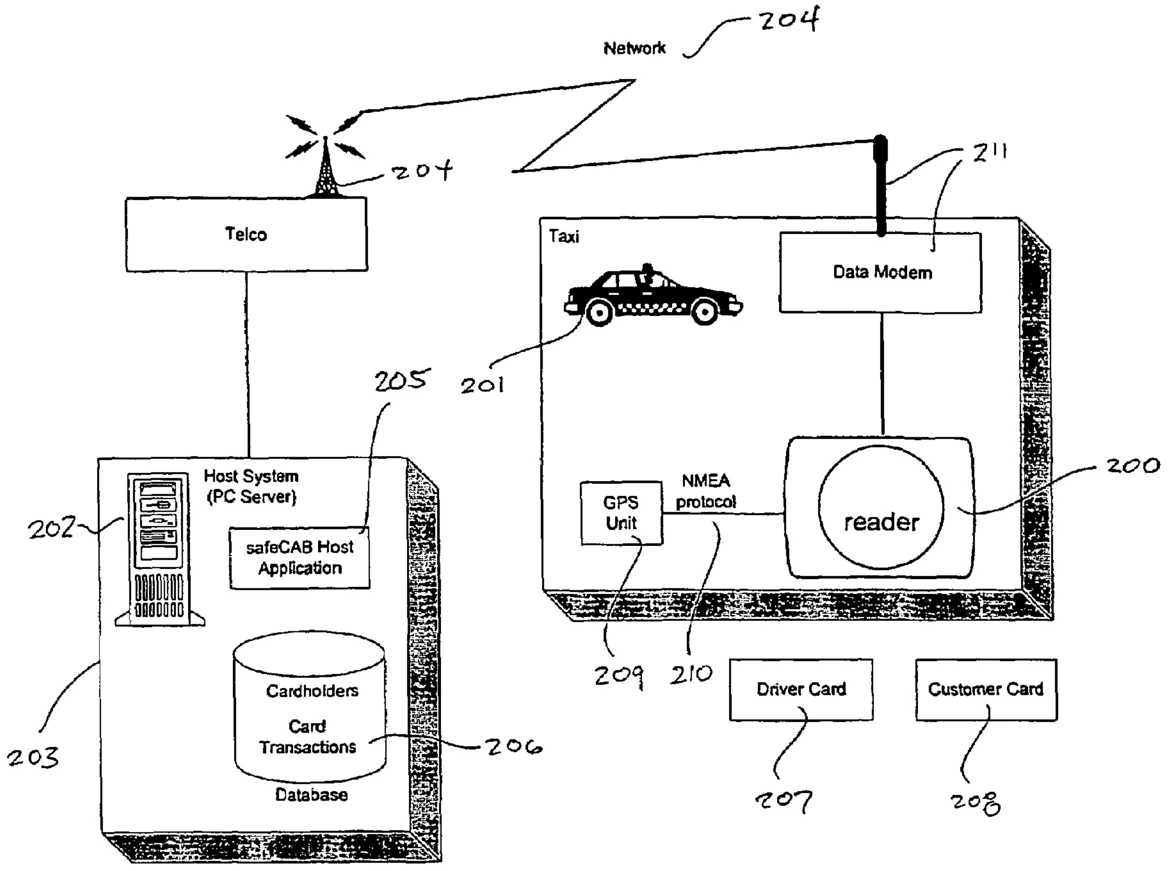
FIG. 11 is a schematic diagram of an embodiment of the invention.

As will be appreciated from the above description and FIG. 11, the information processing components of the present system may be seen as comprising three major parts—the proximity reader or transponder 200 mounted in the taxi 201, the host system 202 at a central location 203 and the data replication facility or infrastructure. The term "proximity reader" or "card reader" refers to the actual sensor or antenna which receives card data and also to the computer and software required to analyse, store and make use of the captured data. The data replication facility or infrastructure is a combination of hardware and software which is run over a network such as a GPRS network 204. The data replication facility allows for the efficient transmission of data between the host system 202, its database 206 and the host side software 205 and the taxis 201. The data replication facility allows the information between host and a taxi or a plurality of taxis to be exchanged in batches, rather than necessarily in real time. The batch interval may range from minutes or hours to a full day. The host system is, for example, a PC, application software, a database and its software as well as a GPRS interface or gateway to the network 204.

A proximity reader 200, such as an RFID reader, will be installed in each taxi 201. The proximity reader 200 reads proximity cards (driver cards 207 and passenger cards 208) and validates the card. In preferred embodiments the proximity reader interfaces to a GPS unit 209 using, for example, the NMEA protocol 210. In this way, the proximity reader may obtain the taxi's longitude and latitude and other data from the GPS unit. The proximity reader 200 may for example obtain the date and time from the GPS Unit. The proximity reader 200 preferably uses the last known location if the GPS Unit has no signal when a passenger is picked up. Data is transmitted and received via a mobile data modem 211.

A hot card is defined as a proximity card that has been blocked, usually because it has been lost or stolen. The proximity reader preferably caches a list of hot card numbers, for example 1000 hot card numbers referred to as a hot list. In preferred embodiments, the proximity reader should contain the current hot list in less than 20 seconds after the ignition or auxiliary power circuit in the taxi 201 is turned on.

At the start of a shift the driver will present a drivers proximity card 207. Each time a driver card is read the proximity reader 200 must create and store a new driver proximity card transaction. A Driver Card Transaction must include the following information:

Date and time from the GPS.

Driver card number.

Longitude and latitude location coordinates from the GPS.

Each time a customer card is read the proximity reader must create and store a new card transaction. A card transaction will preferably include the following information:

Date and time from the GPS.

Customer card number.

Longitude and latitude location coordinates from the GPS.

The proximity reader 200 must queue card transactions in a dead spot but upload as soon as possible or when scheduled. The proximity reader must also create card transactions for cards that fail the verification process including why they were rejected, e.g. because it's a hot card or damaged etc.

The proximity reader preferably authenticates a card using an authentication scheme. Thus, the proximity reader must verify the application ID on the card, and verify that the card is not in the hot list. In preferred embodiments the proximity reader provides user feedback to the driver when a card has been accepted. The proximity reader may provide audio or other feedback to the driver when a card has been rejected. The reader will optimally provide user feedback to the customer when a card has been accepted or rejected.

The requirements for data replication are stated at a high level of abstraction to allow for choices in data transfer. The replication facility preferably does not require any driver involvement nor does it rely on taxis visiting a particular physical location, or locations, at regular intervals. Accordingly it is preferred that the replication facility must not require taxi drivers to deviate from their normal routes or routine.

The replication facility must minimize the overall data transfer costs taking into account capital expenditure and operating expenditure. It will preferably retrieve card transactions within thirty minutes of creation and will not loose card transactions under normal operational circumstances. The replication facility must download amendments to the hot card list in a timely fashion—the target is that all operating cabs are updated within ten minutes. Thus, the replication facility must preferably be able to download an entire hot card list of 1000 records into the proximity reader in less than 5 minutes, with the less then 1 minute being the optimum.

The replication facility must be able to detect if the hot card list in the proximity reader is out of sync with the host system and automatically repair the hot card list in the proximity reader. The replication facility may queue hot card updates for each proximity reader while the communications link is down (e.g. taxi in a radio coverage dead spot) or the taxi is not operating. The replication facility must guarantee delivery of each hot card message without corruption or loss.

The proximity reader must periodically check the integrity of the hot card list using for example, a CRC.

The replication facility will preferably queue card transactions while the communications link is down or in a dead spot and guarantee delivery of each card transaction without corruption or loss.

The proximity reader 200 must not rely on having radio reception when a passenger is picked up nor rely on having a current GPS reading when a passenger is picked up. I.E. it should use the last known position coordinates. However, it is preferred that the proximity reader flag any rides that do not have a current GPS reading and it must send through the next known position coordinates when the signal returns.

The host system 202 runs on a server at a central location 203. It is used for setting up cardholder accounts, issuing cards, blocking cards and viewing card transactions. The host system stores a list of cardholders in a database and may import cardholder data. The host system allows a new cardholder account to be created and, allows a new or replacement card to be issued to a cardholder and allow a card to be blocked, i.e. the hot card. The host system allows cardholder details to be entered or modified or retired.

The host system preferably retains the following data about a cardholder account:

Cardholder Name
Card Number
Cardholder Type—driver or customer
Address
Phone
Status i.e. active, blocked or retired The host system also stores an electronic journal of card transactions in a database 206 and preferably allows the most recent card transactions to be viewed as they occur. It may associate a vehicle identifier with each card transaction.

The host system must provide a reporting facility for cardholder accounts.

The cardholder account report preferably allows the following filters and may allow the following sort orders:

Cardholder Name
Card Number
Cardholder Type—driver or customer
Status i.e. active, blocked or retired The host system preferably provides a reporting facility for card transactions thus allowing the following filters:

Time Window
Cardholder Name
Card Number
Cardholder Type—driver or customer
Attempted use of a Hot Card
Vehicle ID A card transaction report may allow the following sort orders:

Date and time
Cardholder Name
Card Number.
Vehicle ID

The host system may provide an automatic backup facility for all data stored in the database.

In addition to the functional requirements, there are also non-functional requirements for the equipment. These demands are not related to what the equipment is precisely required to do, but rather the manner in which it performs the functions. For example, the proximity reader 200 must be able to authorize (verify) a card in less than 3 seconds, with less than 1 second being optimum and have a read range of at least 25 mm from the outside of the vehicle, through glass. The proximity reader must not malfunction due to the high temperatures reached in the interior of the vehicle parked outside on a summer's day. The proximity reader and associated equipment must not cause interference with any existing radio communications equipment installed on the taxi. The reader must cope with the power supply fluctuations typical in an automotive application, including cold starts and must not cause excessive drain on the taxi's battery while the engine is turned off. As a guideline, it should not flatten the battery after 72 hours.

While the present invention has been described with reference to particular details of operation and of construction, these will be understood as having been provided by way of example and not as limitations to the scope or spirit of the invention as defined in the claims.

What is claimed is:

1. A vehicle safety system comprising:

a portable transponder mounted on or within a vehicle, the transponder adapted to acquire passenger data from a wireless data source presented by a potential passenger from outside a vehicle;

the transponder communicating with a vehicular data processing device, this device adapted to store data acquired by the transponder, compare the stored data to other data supplied from an external source and provide an indication to a driver of the vehicle when the comparison indicates a risk associated with the passenger.

2. The safety system of claim 1, further comprising:

a GPS transponder which supplies data to the vehicular data processing device, the vehicular data processing device capturing longitude and latitude location coordinates from the GPS transponder and creating a record of latitude location coordinates associated with a passenger movement.

3. The safety system of claim 1, further comprising:

a GPS transponder which supplies data to the vehicular data processing device, the vehicular data processing device capturing longitude and latitude location coordinates and a date and time from the GPS transponder and creating a record of latitude location coordinates associated with a passenger movement.

4. The safety system of claim 1, further comprising:

a host computer connected to a wireless network over which operates a data replication infrastructure.

5. The safety system of claim 4, wherein:

the host computer stores a list of cardholders in a database and may import cardholder data, the host allowing a new cardholder account to be created and, storing data indicating that a card is to be blocked.

6. The safety system of claim 1, further comprising:

a keypad mounted on an exterior of the vehicle, the keypad supplying a PIN number entered by the passenger to the vehicular data processing device.

7. The safety system of claim 1, wherein:

the vehicular data processor caches a list of blocked or hot passenger card numbers provided from an external source.

8. The safety system of claim 1, wherein:

the vehicular data processor stores a driver proximity card transaction when a driver presents a driver card to the transponder.

9. The safety system of claim 8, further comprising:

a GPS transponder which supplies data to the vehicular data processing device, the vehicular data processing device capturing longitude and latitude location coordinates and a date and time from the GPS transponder and creating a record of latitude location coordinates associated with a driver when the driver card is presented to the transponder.

10. A vehicle safety system comprising:

a portable transponder mounted to a vehicle, the transponder adapted to acquire passenger data from a wireless data source presented by a potential passenger from outside a vehicle, the passenger data further comprising biometric data;

the transponder communicating with a vehicular data processing device, this device adapted to process data acquired by the transponder, and provide the biometric data or data derived from it to a driver of the vehicle for use by the driver for comparison with an actual biometric feature of the passenger.

11. The safety system of claim 10, further comprising:

a GPS transponder which supplies data to the vehicular data processing device, the vehicular data processing device capturing longitude and latitude location coordinates from the GPS transponder and creating a record of latitude location coordinates associated with a passenger movement.

12. The safety system of claim 10, further comprising:

a GPS transponder which supplies data to the vehicular data processing device, the vehicular data processing device capturing longitude and latitude location coordinates and a date and time from the GPS transponder and creating a record of latitude location coordinates associated with a passenger movement.

13. The safety system of claim 10, further comprising:

a host computer connected to a wireless network over which operates a data replication infrastructure.

14. The safety system of claim 13, further comprising:

the host computer stores a list of cardholders in a database and may import cardholder data, the host allowing a new cardholder account to be created and, storing data indicating that a card is to be blocked.

15. The safety system of claim 10, further comprising:

a keypad mounted on an exterior of the vehicle, the keypad supplying a PIN number entered by the passenger to the vehicular data processing device.

16. The safety system of claim 10, further comprising:

the vehicular data processor caches a list of blocked or hot passenger card numbers provided from an external source.

17. The safety system of claim 10, further comprising:

the vehicular data processor stores a driver proximity card transaction when a driver presents a driver card to the transponder.

18. The safety system of claim 17, further comprising:

a GPS transponder which supplies data to the vehicular data processing device, the vehicular data processing device capturing longitude and latitude location coordinates and a date and time from the GPS transponder and creating a record of latitude location coordinates associated with a driver when the driver card is presented to the transponder.

19. A method of safeguarding the safety of a vehicle, comprising the steps of:

using a portable transponder mounted on or within a vehicle to acquire passenger data from a wireless data source presented by a potential passenger from outside a vehicle;

processing the passenger data with the vehicular data processing device to store data acquired by the transponder;

using the vehicular data processing device to compare stored data to other passenger related data supplied from a wireless network; and using the vehicular data processing device to provide an alert to a driver of the vehicle when the comparison indicates a risk associated with the passenger.

20. The method of claim 19, further comprising the steps of:

capturing GPS data with a vehicular GPS transponder and transmitting the GPS data to the vehicular data processing device; and associating the GPS data with the passenger data to create a record of passenger movement according to time.

* * * * *